United States Patent [19]

Orlowski et al.

[11] 3,810,230

[45] May 7, 1974

[54] DEMAGNETIZER AND CLEANING CARTRIDGE

[75] Inventors: Donald W. Orlowski, Glenview; Edward A. Eul, Jr., Northbrook, both of Ill.

[73] Assignee: Ampex Corporation, Redwood City, Calif.

[22] Filed: Jan. 12, 1972

[21] Appl. No.: 217,152

[52] U.S. Cl. .......................... 360/128, 317/157.5

[51] Int. Cl. .......................... G11b 5/46, G11b 27/24

[58] Field of Search . 179/100.2 D, 100.2 Z, 100.2 K, 179/100.2; 317/157.5; 274/47

[56] References Cited

UNITED STATES PATENTS

| | | | |
|---|---|---|---|
| 3,655,924 | 4/1972 | Puskas | 179/100.2 D |
| 3,647,990 | 3/1972 | Eul | 179/100.2 D |
| 3,443,037 | 5/1969 | Dann | 179/100.2 D |
| 3,449,528 | 6/1969 | Camras | 179/100.2 D |
| 3,435,300 | 3/1969 | Sato | 179/100.2 D |
| 3,439,922 | 4/1969 | Howard | 179/100.2 Z |

*Primary Examiner*—Terrell W. Fears
*Assistant Examiner*—Alfred H. Eddleman

[57] ABSTRACT

A cartridge-shaped unit may be operatively associated with a four or eight track magnetic tape playback and/or recording apparatus to position a cleaning tape and a multi-polar permanent magnet in position for cleaning and demagnetizing a transducer head of the apparatus. The cleaning tape is driven by the capstan and a cam is driven by the cleaning tape to slowly withdraw the magnet which rotates and produces a reversing flux field of diminishing intensity to demagnetize the head. Preferably, the cam includes a spiral grooved section. A stylus cam follower on a slide carrier follows the groove and shifts the carrier to retract the magnet slowly and automatically. Means in the form of a foil is detected by a sensing means in the apparatus thereby causing the head to shift and bring each section of the head associated with a track into contact with the cleaning tape.

7 Claims, 4 Drawing Figures

DEMAGNETIZER AND CLEANING CARTRIDGE

This invention relates to a cartridge-like demagnetizer and cleaner unit for cleaning and demagnetizing a transducer head of a magnetic tape recorder or player.

The present invention is directed to a demagnetizer and cleaner unit of the kind generally shown in Eul et al. patent application, Ser. No. 6,984, filed Jan. 30, 1970, entitled demagnetizer and cleaner, now U.S. Pat. No. 3,439,922. Demagnetizer and cleaner units of this kind clean and demagnetize transducer heads without the necessity of connecting to an alternating current electrical source to provide a reversing flux field as in other types of head demagnetizers. Also, these demagnetizer and cleaner units may be used without any special skill or knowledge on the part of the operator as the unit automatically provides a diminishing intensity for the reversing flux field whereas heretofore one had to slowly and manually withdraw an alternating current demagnetizer from the transducer head. Thus, it will be recognized that such demagnetizer/cleaners are particularly useful for demagnetizing and cleaning magnetic recorders and players used in automobiles or out of doors where no electrical outlet is convenient or where the operator does not want to be bothered with a tedious manual cleaning chore.

Demagnetizer and cleaning units of this kind are small, compact and have an outer housing generally similar to a magnetic tape cassette or a cartridge. The present invention is directed to a unit having a cartridge-like housing similar to the conventional magnetic tape cartridge carrying four or eight track endless magnetic tapes therein. Such magnetic tape cartridges are held by a biasing force in a playback or recording position with a capstan projected into an opening in a front side wall of the cartridge to establish a tape transport couple with a pressure member carried within the cartridge. Upon transport of the tape through the length of the endless band, means on the tape such as a foil are sensed and cause a shifting of the transducer head to record or playback from another track on the magnetic tape.

Accordingly, a general object of this invention is to provide an improved demagnetizer and cleaner unit having a cartridge-shaped housing for cleaning and demagnetizing transducer heads of a cartridge playback or recording apparatus.

Other objects and advantages of the invention will become apparent from the following detailed description taken in connection with the accompanying drawings in which.

Figure 1:
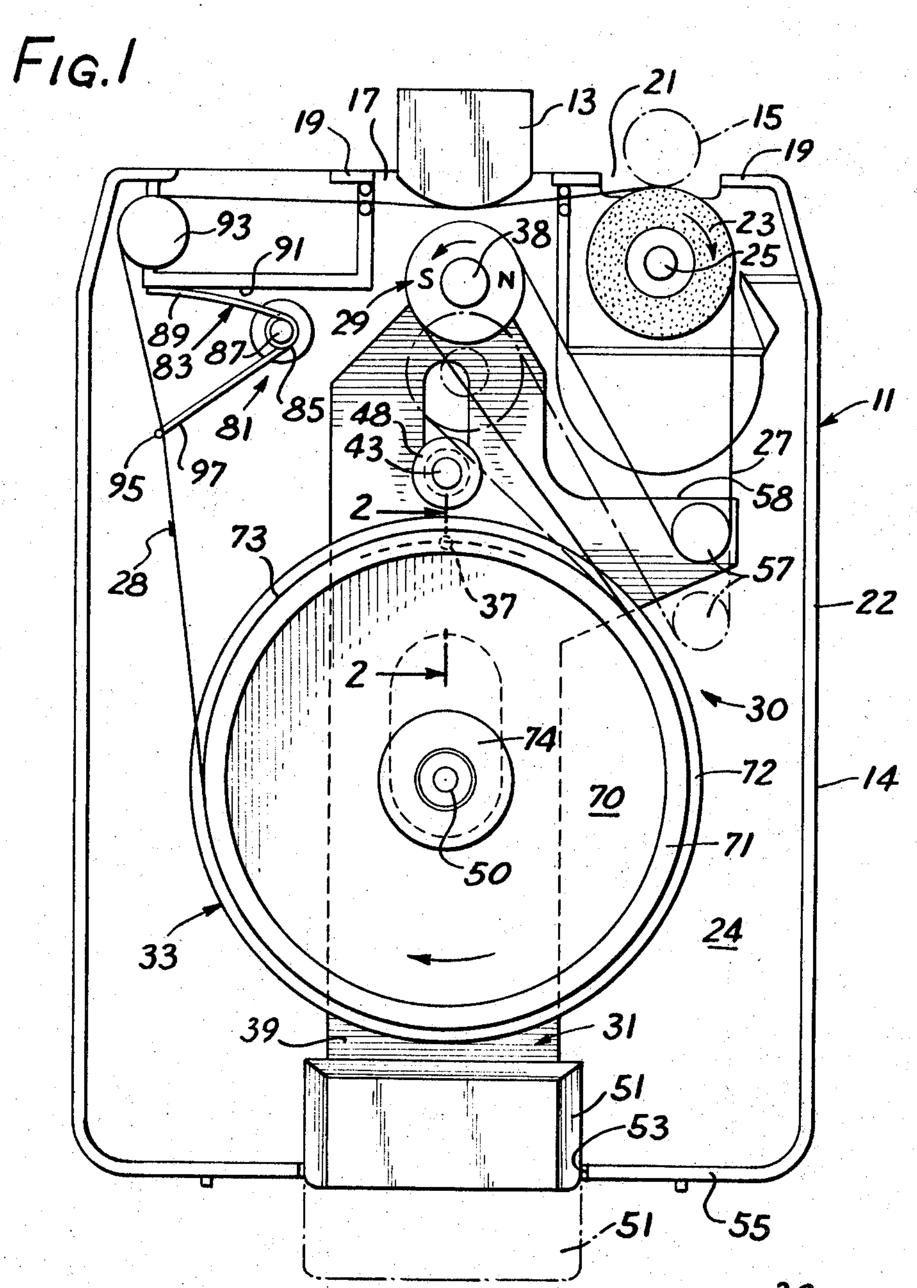
FIG. 1 is a plan view of a demagnetizer and cleaning unit with the top cover removed and embodying the novel features of the invention.

As shown in the drawings for purposes of illustration, the invention is embodied in a cartridge-like unit 11 which is used to clean and demagnetize a transducer head 13 of a magnetic tape cartridge player or recording apparatus (not shown) without having to provide an electrical power source connection for the unit. The demagnetizer unit 11 has a housing 14 which has the dimensions and the shape of a standard magnetic tape cartridge containing an endless, eight track magnetic tape. When the unit 11 is positioned in the manner of a cartridge is positioned for playback or recording in the apparatus, the transducer head 13 of the apparatus projects into an opening 17 of a front side wall 19 of the housing 14 and a capstan 15 projects into another opening 21 in the front side wall 19 of the housing to drive a cleaning tape 27. Usually, the unit is held under a biasing force from rollers engaged in a notch (not shown) in a longitudinal side wall 22 of the housing 14 to urge the unit 11 to establish a tape feed couple between the capstan 15 and a pressure or pinch roller 23 rotatably mounted within the housing 14. In this instance, the pressure roller 23 is journaled on an upstanding spindle 25 fixed to a bottom wall 24 of the housing 14.

The cleaning tape 27 is endless, i.e., in a form of a closed loop, and has a metallic foil 28 thereon. A portion of the tape 27 extends partially about the outwardly facing circumferential surface of the pressure roller 23 at the opening 21 for contact by the capstan 15 when the unit 11 is in use. As the cleaning tape 27 travels past the transducer head 13, it engages and wipes dirt or other foreign matter which might have accumulated on the transducer head. Likewise, the cleaning tape simultaneously wipes the surfaces of the capstan 15 and pressure roller 23 engaged thereby. A multi-polar permanent magnet 29 is rotated to provide a reversing flux field and the magnet 29 is moved away from the transducing head 13 in a controlled manner to diminish the intensity of the magnetic field thereby demagnetizing the transducer head.

In accordance with the present invention, a new and improved means 30 are provided for rotating the magnet 29 through a number of revolutions, e.g., seven or eight revolutions, while the transducing head 13 is shifted to bring each of the head's track sensing portions into wiping contact with the tape and the magnet is being slowly retracted, e.g., through a distance of less than one inch in ten seconds of time. As the magnet rotating and shifting means 30 is driven only by a very small input torque from the rotating capstan 15, the rotation of the magnet 29 and the slow and automatic withdrawal of the rotating magnet from the transducer head must be accomplished with a light operating force and without experiencing large frictional retarding forces.

To these ends, the magnet 29 is mounted on a shiftable slide or carrier 31 which is easily and automatically shifted away from the transducer head 13 by a cam means including a rotatable cam 33 having a cam follower 37 connected to the carrier 31. As will be explained, the tape 27 rotates the cam 33 and the cam follower shifts the carrier continuously and gradually to provide the decreasing intensity for the flux field being generated by the rotating magnet 29. Preferably the carrier 31 is constrained for rectilinear travel by guide means in the cartridge housing 14.

Referring now in greater detail to the illustrated elements of the unit 11, the magnet 29 is cylindrical or barrel-shaped and has a pair of diametrically opposite north and south poles for rotating past the transducer head 13. The magnet is mounted on an upstanding axle 38 which is fixed at its lower end to a flat plate or portion 39 of the carrier 31. The cleaning tape 27 is wrapped practically about the circumferential surface of the magnet with sufficient frictional engagement to prevent slippage between the tape and the magnet so that the magnet will rotate with a peripheral surface velocity substantially identical to the linear velocity of the cleaning tape 27. The linear velocity of the cleaning tape 27 will be substantially equal to the tape transport speed that a magnetic tape of a cartridge would be driven by the capstan 15 of the playback or recording apparatus. The illustrated magnet is about 0.375 inch in diameter, about 0.250 inch in width, and made of barium oxide. It will be understood that other magnetic materials and sizes of magnets may be used. Also, the number of poles for the permanent magnet may be increased and still utilize the principles of the present invention.

The permanent magnet 29 is carried on a rectilinear path by its carrier 31 which is constrained to travel in a straight line by a guide means including guides 43 and 45 each inserted into an elongated slots 47 and 49 respectively in the flat plate 39 of the carrier 31. To reduce friction between the carrier and the guides 43 and 45, the latter may be in the form of circular washers. A smaller forward washer guide 43 encircles a post 46 molded integrally with the bottom housing wall. The washer guide 43 is held on the post 46 by a hold down 48 in the form of a spring washer secured to the post 46. The rear washer guide 45 encircles a fixed center post 50 on which is mounted the cam 33. The sliding of the carrier is limited when the washer guides 43 and 45 abut the rounded ends of the elongated guide slots 47 and 49. The washer guides 43 and 45 may be freely turnable on their respective posts to assure a low friction guiding of the carrier 31.

The illustrated carrier 31 is in the form of a flat strip about 1/16 inch in thickness of aluminum with a rearward end thereof bent upwardly and fastened to a push button 51. Prior to initiating a cleaning and demagnetizing operation, the push button 51 is forced inwardly, e.g. from a dotted line position shown in FIG. 1 to the solid line position shown in FIG. 1, through an opening 53 in a rear side wall 55 of the housing 14 to slide the carrier 31 forwardly to position the magnet 29 adjacent the front housing wall 19 of the unit 11. The push button 51 is a block shaped member made of plastic and may have a suitable legend such as "push" thereon to instruct the user. Also, to reduce the frictional force needed to slide the carrier 31, the bottom surface of its plate 39 may rest on a series of spaced pads of button shaped molded integral with the bottom wall 24 of the housing.

To assure a long wrap about the magnet 29, the tape 27 leaves the cam 33, travels to and about the magnet and then is doubled back to a stationary tape guide post 57 attached at its lower end to the carrier 31. The guide post is carried on a laterally extending arm 58 of the carrier at a position adjacent the cam in a plane slightly to the right of the pressure roller 23 as viewed in FIG. 1.

The cam is particularly effective to retract the carrier 31 and magnet 29 slowly while the endless cleaning tape 27 is traveling through several complete cycles, e.g., 4 cycles, and the transducer head 13 is being shifted to bring spaced tape engaging portions thereof into engagement with the cleaning tape. When the metal foil 28 is detected by sensing contacts (not shown) of the playback and recording apparatus, a solenoid is operated in the apparatus to move vertically the transducer head 13 to align another portion thereof with the cleaning tape.

In the illustrated embodiment of the invention, the spiral cam groove 35 formed in the undersurface 61 of the cam 33 and is of sufficient length that about seven or eight revolutions of the cam are required as well as at least ten seconds of operation before the stylus cam follower 37 travels from an outer section 66 (FIG. 2) to an inner section 67 of the cam groove 35. Between the inner and outer sections the cam groove is generally a continuous spiral in configuration. However, the last or inner section 67 of the cam groove is preferably circular in shape so that the cam 33 may turn freely with the projecting stylus 37 therein while the tape continues to travel to assure that all of the tape contacting portions of the head 13 have been shifted into contact therewith. For instance, the instructions to the user may indicate that the unit 11 should be allowed to remain in playback or recording apparatus for a brief interval after the push button 51 is pushed outwardly of the rear housing wall 55 to assure that the transducer head 13 has shifted completely for each track position.

The cam 33 is generally in the shape of a circular wheel having a circular disk 70 with an upwardly projecting driving rim 71 about which is wrapped the tape 27 for turning the cam. Preferably, a tape support flange 72 projects radially outward from an outer circular tape engaging surface 73 on the rim to support the lower longitudinal edge of the tape. Disposed coaxially with the driving rim 71 is an internal hub 74 which also projects upwardly from the central disk 70 and has a central cylindrical opening 75 to be telescopingly inserted over post 50 fixed at lower end to housing bottom wall 24. A spring or spring washer (not shown) or other light biasing means may be placed between a top annular surface 76 of the hub 74 and the top cover (not shown) to hold the cam 33 engaged in the cam follower 37 against shifting axially along the center post 50 when the unit 11 is being manipulated or stored.

Figure 2:
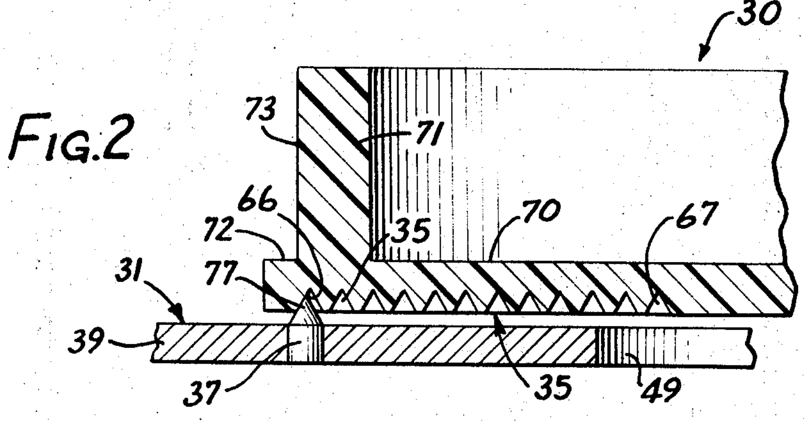
FIG. 2 is an enlarged, fragmentary sectional view taken substantially along the line 2—2 of FIG. 1.
Figure 3:
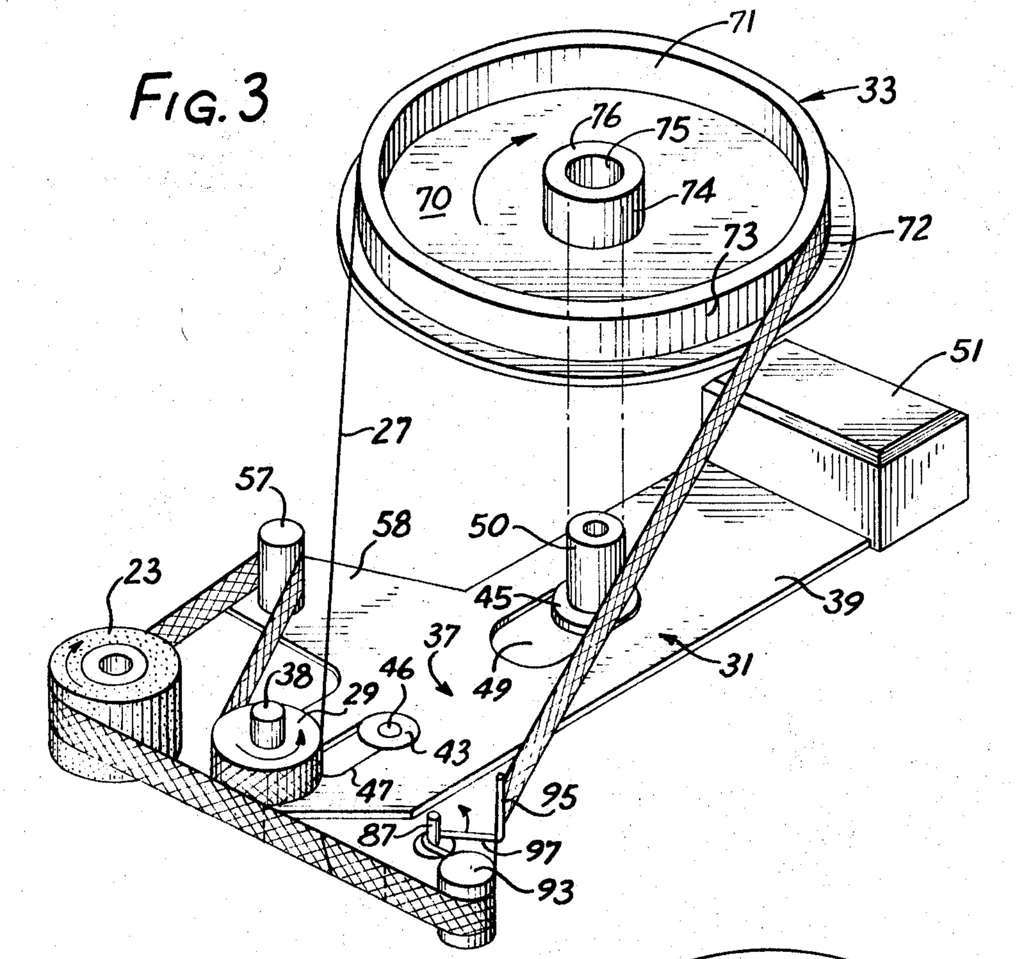
FIG. 3 is an exploded perspective view of a cleaning tape, magnet, carrier and rotatable cam used in the unit of FIG. 1.
Figure 4:
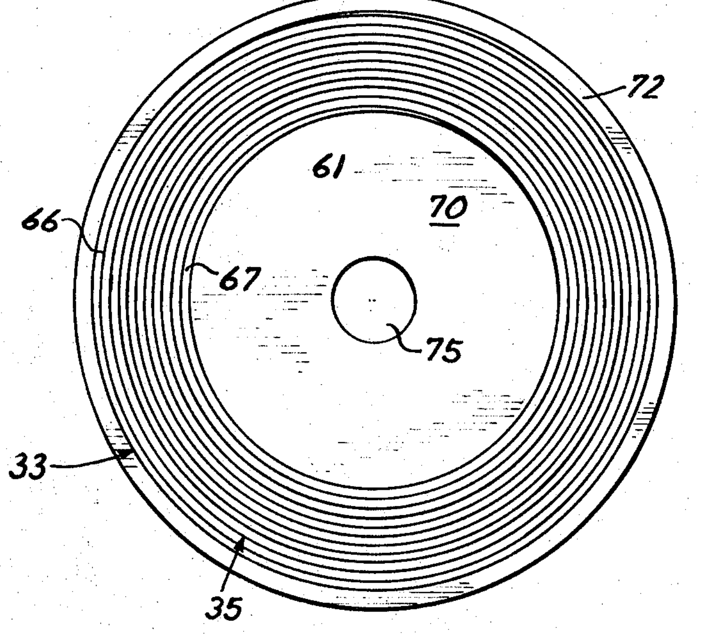
FIG. 4 is a bottom view of the cam shown in FIG. 3.

The illustrated cam 33 is made preferably of plastic and in one piece for low cost construction. The cam follower stylus 37 may be formed of a hardened tool steel with rounded end on a conical point 77, as best seen in FIG. 2, to slide readily within the cam groove 35. In this instance, the cam groove is defined by intersecting walls inclined 30° to the vertical and has a depth of about 0.040 inch. It will be appreciated that the camming action must be with a minimum of friction and without binding as the entire torque from the capstan 15 for cleaning, rotating the magnet 29 and shifting the carrier 31 is not great. For example, 30 or 40 gr. cm. of torque from the capstan 15 should be able to operate the cleaning tape and cause the demagnetizing. Only a light manual push on the push button 51 is required to cause the cam follower 37 to force the cam 33 to move axially on the post 50 and allow the cam follower to slide under the cam 33 as the carrier travels forward toward the transducer head 13 until the cam follower arrives at the outer groove section 66 at which time the cam 33 will drop and the push button will have been returned. The preferred plastic for the cam 33 is sufficiently tough and physically strong to accept this longitudinal sliding of the point cam follower across the cam grooves without being seriously scored.

To assist in providing sufficient wrap of tape 27 about the rim 71 of the cam 33, there is provided a tape biasing means 81 which includes a torsion spring 83 having a central looped portion 85 wrapped about a post 87 fastened to housing bottom wall 24. One leg 89 of the torsion spring 83 abuts an upstanding wall 91 in the housing 14 adjacent to another stationary tape guide post 93 fixed to upper and/or lower walls of the housing 14. The other end of the torsion spring 83 is provided with an upstanding tape engaging pin-like portion 95 which is disposed to engage the outer side of the tape and deflect the tape slightly inwardly from traveling along a straight line path extending tangentially between the cam rim 71 and the guide post 93. As spring leg 97 is flexed and tensioned and tries to move the tape engaging portion 95 thereon in the counterclockwise direction, the spring functions to take up any slack in the tape.

The preferred cleaning tape 27 is a commercially available tape of the non-abrasive kind although an abrasive tape carrying fine abrasive material bonded to the tape may be used. Both abrasive and non-abrasive cleaning tapes for cleaning sound transducer heads are commercially available. The preferred polyester paper is semi-transparent and has a rough weave appearance generally similar to that of woven cloth. It will be appreciated that other types of cleaning tape may be used in lieu of this preferred tape and still fall within the spirit of the invention. The tape is spliced by a polyester splice although other splices could be used to join the tape ends. Also, means other than a metal foil may be used as a signal to the apparatus to cause a shifting of the transducer head 13.

The tape may be in the form of an endless mobius loop in order that both sides of the cleaning tape 27 may be used for cleaning the transducer head 13. This, in effect, doubles the tape cleaning surface from approximately the same length of tape.

From the foregoing it will be seen that the present invention provides an improved cartridge-like demagnetizer and cleaner unit 11 providing a slow and automatic retraction of a rotating, multi-polar permanent magnet over a period of time to allow a demagnetizing and cleaning of the respective tape engaging portions of a transducer head. The unit is extremely simple in operation and is low cost. The results are that the operator need only to press a button to reset the unit prior to using the same by operation of a simple actuator.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. A cartridge-like demagnetizer and cleaner unit for a transducer head of a magnetic tape playback or recording apparatus, said unit comprising a cartridge-like housing having a top wall, a bottom wall and side walls joined to said top and bottom walls, an endless cleaning tape mounted in said housing for engaging and wiping the transducer head and for travel along a predetermined path in said housing, metallic means carried by said tape for travel therewith along said path and for signaling a predetermined length of travel for said tape along said path, a pressure member in said housing for engaging said cleaning tape and establishing a driving couple with a capstan of said magnetic playback or recording apparatus to transport said tape, a rotatable multi-polar permanent magnet for producing a reversing flux field, a shiftable carrier in said housing for carrying said magnet away from said transducer head to provide a decreasing intensity for said reversing flux field to demagnetize said transducer head, a cam having a spiral cam surface thereon and journaled on said housing for rotation and having a circular surface about which said tape is partially wrapped to turn said cam through a plurality of revolutions with travel of said tape, a cam follower associated with said carrier and connected to said spiral cam surface of said rotatable cam to shift said carrier and the permanent magnet thereon during the revolutions of the cam to provide a decreasing intensity for the reversing flux field.

2. A cartridge-like demagnetizer and cleaner unit for transducer head of a magnetic tape playback or recording apparatus, said unit comprising a cartridge-like housing having a top wall, a bottom wall and side walls joined to said top and bottom walls, an endless cleaning tape mounted in said housing for engaging and wiping the transducer head, a pressure roller rotatably mounted in said housing for engaging said cleaning tape and establishing a driving couple with a capstan of said magnetic playback or recording apparatus to transport said tape, a rotatable multi-polar permanent magnet for producing a reversing flux field, said cleaning tape having a portion thereof wrapped about said permanent magnet for rotating it as said tape is transported, a slideable carrier in said housing for carrying said magnet rearwardly away from said transducer head to provide a decreasing intensity for said reversing flux field to demagnetize said transducer head, guide means in said cartridge housing for guiding said carrier for rectilinear sliding movement, a rotatable cam having a rim about which said cleaning tape is wrapped to turn said cam with travel of said cleaning tape, a cam groove means having a substantially spiral configured portion on said rotating cam, a cam follower stylus on said carrier projecting into said cam groove means for shifting said carrier with turning of said cam to provide a decreasing intensity for the reversing flux field, and a manually operated means for sliding said carrier forwardly from the position said carrier was shifted to by said cam.

3. A cartridge-like demagnetizer and cleaner unit for a transducer head of a magnetic tape playback or recording apparatus, said unit comprising a cartridge-like housing having a top wall, a bottom wall and side walls joined to said top and bottom walls, an endless cleaning tape mounted in said housing for engaging and wiping the transducer head, means on said tape for signaling a predetermined length of travel for said tape, a pressure member in said housing for engaging said cleaning tape and establishing a driving couple with a capstan of said magnetic playback or recording apparatus to transport said tape, a rotatable multi-polar permanent magnet for producing a reversing flux field, a shiftable carrier in said housing for carrying said magnet away from said transducer head to provide a decreasing intensity for said reversing flux field to demagnetize said transducer head, a cam rotatable by said cleaning tape through a plurality of revolutions, a cam follower associated with said carrier and connected to said rotatable cam to shift said carrier and the permanent magnet thereon during the revolutions of the cam to provide a decreasing intensity for the reversing flux field, and an elongated cam groove being formed in said cam to provide an elongated path of travel for said cam follower, said cam follower comprising a stylus fixed at one end to said carrier with another end projecting into said cam groove, and said carrier comprising a slide constrained for rectilinear travel.

4. A unit in accordance with claim 3 in which said cam groove is substantially spiral in shape and in which said cam overlies said carrier with the free end of said cam follower projecting upwardly into said spiral groove.

5. A unit in accordance with claim 4 in which said cam is provided with a circular rim about which is wrapped said cleaning tape for rotating said cam.

6. A unit in accordance with claim 3 in which guide means on said cartridge housing constrains said slide for rectilinear travel.

7. A unit in accordance with claim 6 in which a manual push button is connected to said carrier and is accessible through an opening in a side wall of said housing for manual operation to push said carrier to carry said magnet to a position adjacent said transducer head, said push button being movable by said carrier to indicate the progress of a demagnetizing and cleaning operation.

* * * * *